United States Patent [19]

Nakamura et al.

[11] Patent Number: 4,918,486

[45] Date of Patent: Apr. 17, 1990

[54] THERMAL DEVELOPING AND TRANSFERRING APPARATUS

[75] Inventors: Hiroshi Nakamura; Nagao Ogiwara, both of Kanagawa, Japan

[73] Assignee: Fuji Photo Film Co. Ltd., Kanagawa, Japan

[21] Appl. No.: 348,460

[22] Filed: May 8, 1989

[30] Foreign Application Priority Data

May 10, 1988 [JP] Japan ................................ 63-112728
Jun. 10, 1988 [JP] Japan ................................ 63-143368
Aug. 31, 1988 [JP] Japan ................................ 63-218158

[51] Int. Cl.$^4$ ................................ G03B 27/30
[52] U.S. Cl. ................................ 355/106; 355/27; 355/28
[58] Field of Search ..................... 355/27, 28, 32, 100, 355/106; 430/138; 250/318, 319

[56] References Cited

U.S. PATENT DOCUMENTS 4,620,096 10/1986 Takehara et al. .................. 250/319
4,660,964 4/1987 Yoshikawa et al. .................. 355/28
4,737,822 4/1988 Taniguchi et al. .................. 355/27

FOREIGN PATENT DOCUMENTS 58-149046 9/1983 Japan .
58-149047 9/1983 Japan .
59-152440 8/1984 Japan .
59-154445 9/1984 Japan .
59-165054 9/1984 Japan .
59-168439 9/1984 Japan .
59-174832 10/1984 Japan .
59-174833 10/1984 Japan .
59-174834 10/1984 Japan .
59-174835 10/1984 Japan .
59-180548 10/1984 Japan .
61-23245 1/1986 Japan .
62-65038 3/1987 Japan .

*Primary Examiner*—Michael L. Gellner
*Assistant Examiner*—Khanh Dang
*Attorney, Agent, or Firm*—Sughrue, Mion, Zinn, Macpeak & Seas

[57] ABSTRACT

A thermal developing and transferring apparatus in which light-sensitive material on which an image is recorded is adhered to an image receiving material and is wound around the outer peripheral surface of a heating drum to effect thermal development and to transfer the developed image to the image receiving material. The light-sensitive sheet and the image receiving material are supplied to the periphery of the heating drum after which is curved with predetermined curvatures, thereby being prevented from shifting away from each other during transfer owing to the difference between winding radius with which the two material are wound around the heating drum.

20 Claims, 6 Drawing Sheets

THERMAL DEVELOPING AND TRANSFERRING APPARATUS

BACKGROUND OF THE INVENTION

1. Field of the Invention

This invention relates to a thermal developing and transferring apparatus in which a heat-developable light-sensitive material and an image receiving material are wound around the outer peripheral surface of a heat drum and, then an image exposed on the light-sensitive material is developed and transferred to the image receiving material.

2. Description of the Related Art

A type of image recording apparatus is known in which an image is exposed on a heat-developable light-sensitive material (image forming material). These light-sensitive material and image receiving material come in contact each other, and the image of the light-sensitive material is simultaneously developed and transferred to the image receiving material.

Lengthwise sheets of thermal-developable light-sensitive material used in this type of image recording apparatus are cut in a predetermined length (e.g., 210 mm to obtain A4 sheet, or 420 mm to obtain A3 sheet), superposed one on the other and transported to a thermal development section. In the thermal developing section, the two materials are fed forward in the superposed state while being pinched between a heating drum heated at about 90° C. and an endless pressing belt for a predetermined time, thereby heat-developing the light-sensitive material and transferring the image recorded on the light-sensitive material to the image receiving material.

Before the heat-developable light-sensitive material and the image receiving material are wound around the outer peripheral surface of the heating drum (between the heating drum and the endless pressing belt), these materials are superposed one on the other by a pair of pinch rollers while being kept flat, and are thereafter supplied to the periphery of the heating drum (nip between the heating drum and the endless belt). Thus, the desired reliability relating to the supply of sheets of materials to the nip between the heating drum and the endless belt is ensured.

However, it goes without saying that because one of the heat-developable light-sensitive material and the image receiving material extend inside or outside the other with respect to the radial direction of the heating drum when wound around the same. These materials are wound in the superposed state around the heating drum (between the heating drum and the endless pressing belt) with different winding radii dependent on the thicknesses of these materials. There is therefore a problem in that the materials are shifted from the normal superposed positions as they are wound around the heating drum, although they are suitably superposed by the pair of pinch rollers before they are supplied to the periphery of the heating drum. A positional transfer error is thereby caused when the image recorded on the heat-developable light sensitive material is transferred to the image receiving material, resulting in failure to obtain the desired image.

SUMMARY OF THE INVENTION

In consideration of these facts, an object of the present invention is to provide a thermal developing and transferring apparatus capable of obtaining a good image by preventing the occurrence of any positional transfer error when an exposed heat-developable light sensitive material and an image receiving material are wound around the outer peripheral surface of a drum and heated in order to thermally develop the heat-developable light sensitive material while the image is being transferred to the image receiving material.

In accordance with the present invention, a sensitive material and an image receiving material are superposed with predetermined curvatures before these two materials are supplied to the thermal development section on the outer peripheral surface of a heating drum. The two materials supplied to the thermal developing an transferring section are thereby prevented from shifting away from each other owing to the difference between winding radii with which the two materials are wound around the heating drum, which difference is determined by the thicknesses of the materials, thereby preventing the occurrence of a transfer error.

Superposition of the two materials may be performed before the materials are supplied to the periphery of the heating drum or while winding the two materials around the outer peripheral surface of the heating drum.

To create predetermined curvatures, a plurality of rollers are pressed against the outer peripheral surface of a winding roller or the heating drum with the two materials interposed therebetween so as to curve the materials along the outer peripheral surface of the winding roller or the heating drum. An alternative is to press a soft roller against the outer peripheral surface of the winding roller or the heating roller so as to curve the materials along the outer peripheral surface of the winding roller or the heating drum by virtue of an elastic deformation of the soft roller.

In accordance with the present invention, the heat-developable light-sensitive material basically consists of a sensitive silver halogenide, a binder, a coloring matter supplying compound, and a reducer (which may be omitted if the coloring matter supplying compound functions as the reducer). The light-sensitive material may contain other additives, e.g., an organic silver salt.

The heat-developable light-sensitive material may be of a type that is capable of forming a negative imate by exposure, or one capable of forming a positive image. A positive image may be formed by directly using a system of positive emulsions such as a positive silver halogenide emulsion (there are two systems of this type: one in which a nucleus forming agent is used; and a light fogging method) or a system of using a coloring matter supplying compound capable of releasing a diffusive coloring matter image in a positive manner.

The heat-developable light-sensitive material of the present invention is based on the latter system. That is, it transfers a diffusive coloring matter to a coloring matter fixation element, i.e., an image receiving material. There are various known methods of transferring the diffusive coloring matter, i.e., one in which the coloring matter is transferred to the coloring matter fixation element by the medium of an aqueous solvent such as water; one in which transfer is effected by the medium of a water-exposure thermal solvent; and one in which the coloring matter is transferred to a coloring matter fixation element having a coloring matter receiving polymer by utilizing thermal-diffusive properties or subliming properties of the diffusive coloring matter. The heat-developable light-sensitive material of the present invention may be prepared on the basis of any one of these methods.

Documents in which heat-developable light-sensitive material and image receiving material applicable to the present invention are explained are listed as follows: U.S. Pat. Nos. 4,463,079; 4,474,867; 4,478,927; 4,507,380; 4,500,626; and 4,483,914; Japanese Patent Laid-Open Nos. 58-149046; 58-149047; 59-152440; 59-154445; 59-165054; 59-180548; 59-168439; 59-174832; 59-174833; 59-174834; 59-174835; 62-65038; and 61-23245; and E.P. Laid-Open Nos. 210,660A2, and 220,746A2.

DESCRIPTION OF THE PREFERRED EMBODIMENTS

Embodiments of the present invention will be described below.

Figure 1:
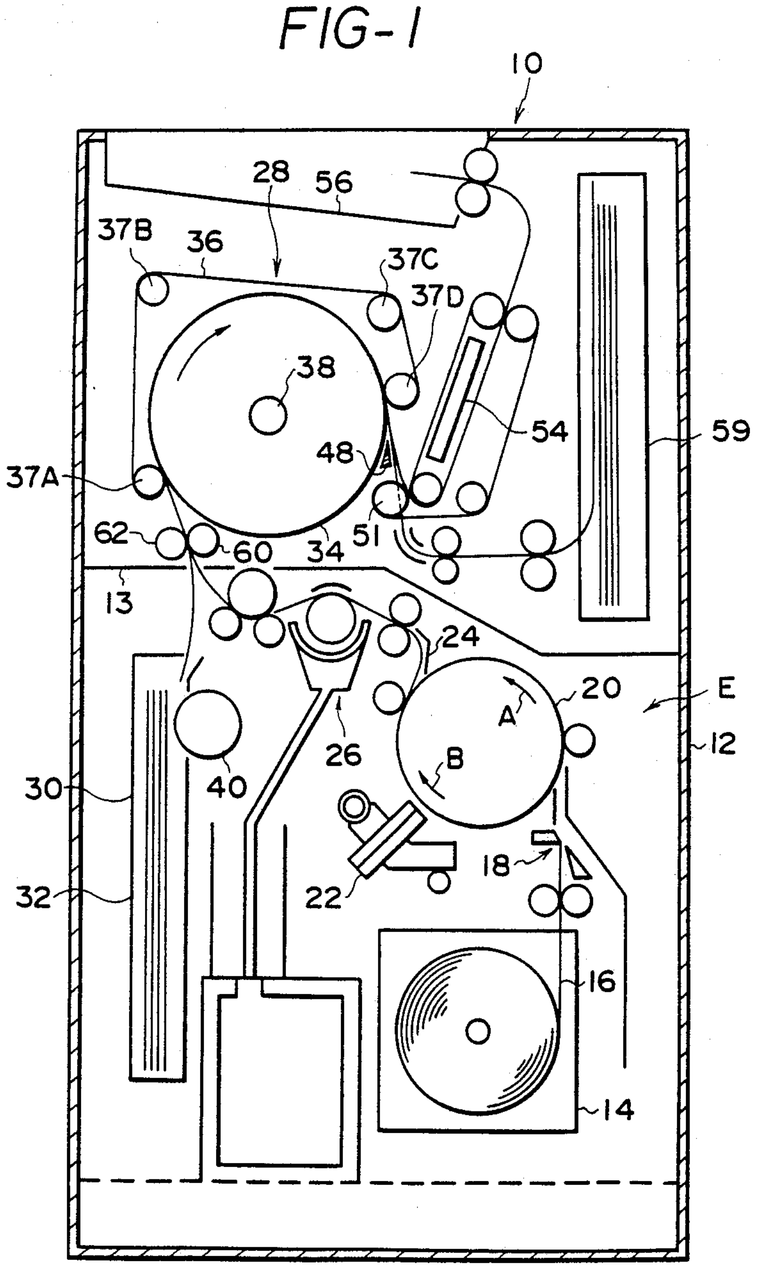
FIG. 1 is a cross-sectional view of an image recording apparatus to which an embodiment of the present invention is applied.

FIG. 1 shows an image recording apparatus 10 to which a thermal developing and transferring system in accordance with the present invention is applied. The interior of the image recording apparatus 10 has a base frame 12 which is sectioned by a partition wall 13 disposed at an intermediate portion of the apparatus to define an exposure chamber E under the partition wall 13 and a developing an transferring chamber D above the partition wall 13. A roll of light-sensitive material, or image forming sheet 16, is accommodated in a magazine 14 placed in the exposure chamber E. The light-sensitive material 16 is unrolled from the outer circumferential end of the roll and is cut by a cutter 18 in a predetermined length. The cut-off portion of light-sensitive material 16 is wound around the outer peripheral surface of a rotary drum 20 in the direction of the arrow A. An exposure head 22 is disposed so as to face the outer peripheral surface of the rotary drum 20. The rotary drum 20 is rotated in the direction of the arrow B so as to expose the image on light-sensitive material 16. A plurality of elements for emitting light of different colors, e.g., cyan (C), magenta (M) and yellow (Y), to the heat-developable light-sensitive material 16 are incorporated in the exposure head 22. The heat-developable light-sensitive material 16 is exposed to light emitted from these light emitting elements so that image information is recorded on the heat-developable light sensitive material 16.

After undergoing exposure, the light-sensitive material 16 is separated from the rotary drum 20 by a scraper 24 as the rotary drum 20 is rotated in the reverse direction, and water, provided as an image formation solvent, is applied to the light-sensitive material 16 from a water application section 26. The light-sensitive material 16 is thereafter sent to a thermal developing an transferring section or unit 28 which is disposed in the developing and transferring chamber D.

Figure 2A:
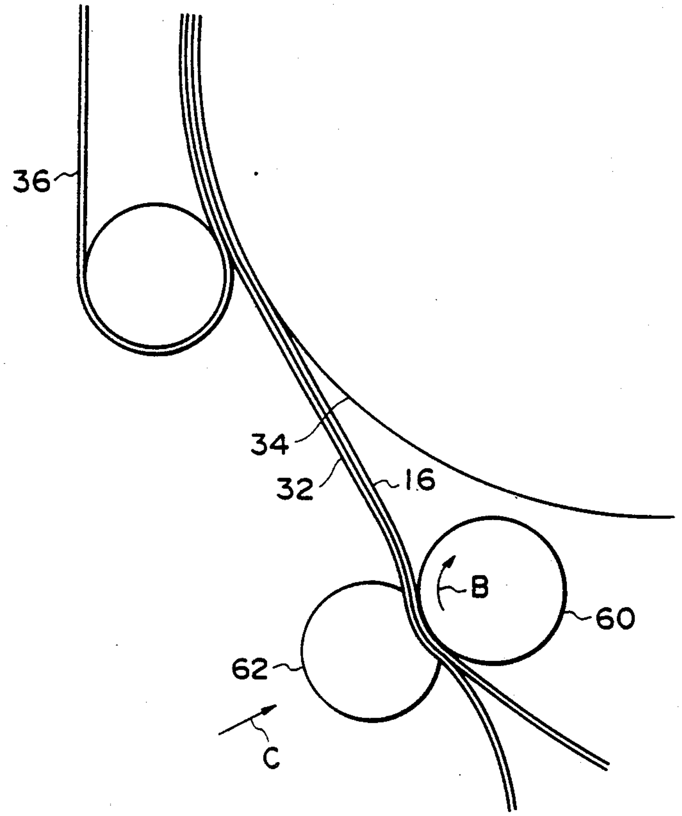
FIG. 2A is an enlarged view of a portion of FIG. 1.

The thermal developing and transferring section 28 consists of a heating drum 34, an endless pressing belt 36 and a pair of superposition rollers 60 and 62. The heating drum 34 is formed of aluminum, and has an outside diameter of 140 mm and an axial length of 300 mm. An axially central portion of the outer peripheral surface of the heating drum 34 is convered with a silicone rubber 50, as shown in FIG. 2C. The width of the portion covered with the silicone rubber 50 is 234 mm which is substantially the same as the width (230 mm) of the image projected on the exposed heat-developable light-sensitive material 16 (having a width of 254 mm). The silicone rubber 50 has electroconductive properties, a friction coefficient $\mu$ of 0.5 to 0.6 or more, a rubber hardness of 40 to 90 degrees, and a thickness t of 0.2 to 3 mm (more preferably, about 0.6 mm).

A halogen lamp 38 is disposed in the heating drum 34, and the outer peripheral surface of the heating drum 34 is heated at about 90° C. by the halogen lamp 38.

The endless pressing belt 36 is wound around tension rollers 37A to 37D each having an outside diameter of 20 mm. The outer major surface of the endless belt 36 is brought into contact with the outer peripheral surface of the heating drum 34 under pressure.

After water has been applied to the head-developable light-sensitive material 16, the light-sensitive material 16 is supplied to the nip between the heating drum 34 and the endless pressing belt 36 and is fed forward through a distance of about $\frac{5}{8}$ the circumference of the heating drum 34 (240 mm) by being pinched between the heating drum 34 and the endless pressing belt 36. During this movement, thermal development is effected.

The temperature of the heating drum 34 is constantly maintained while being detected by a temperature sensor 39 disposed in the vicinity of the peripheral portion of the heating drum 34. The endless pressing belt 36 is, for example, comprised of a thin belt formed from steel or nickel with a smooth surface and having a thickness of 50 to 100 $\mu$m.

Figure 2B:
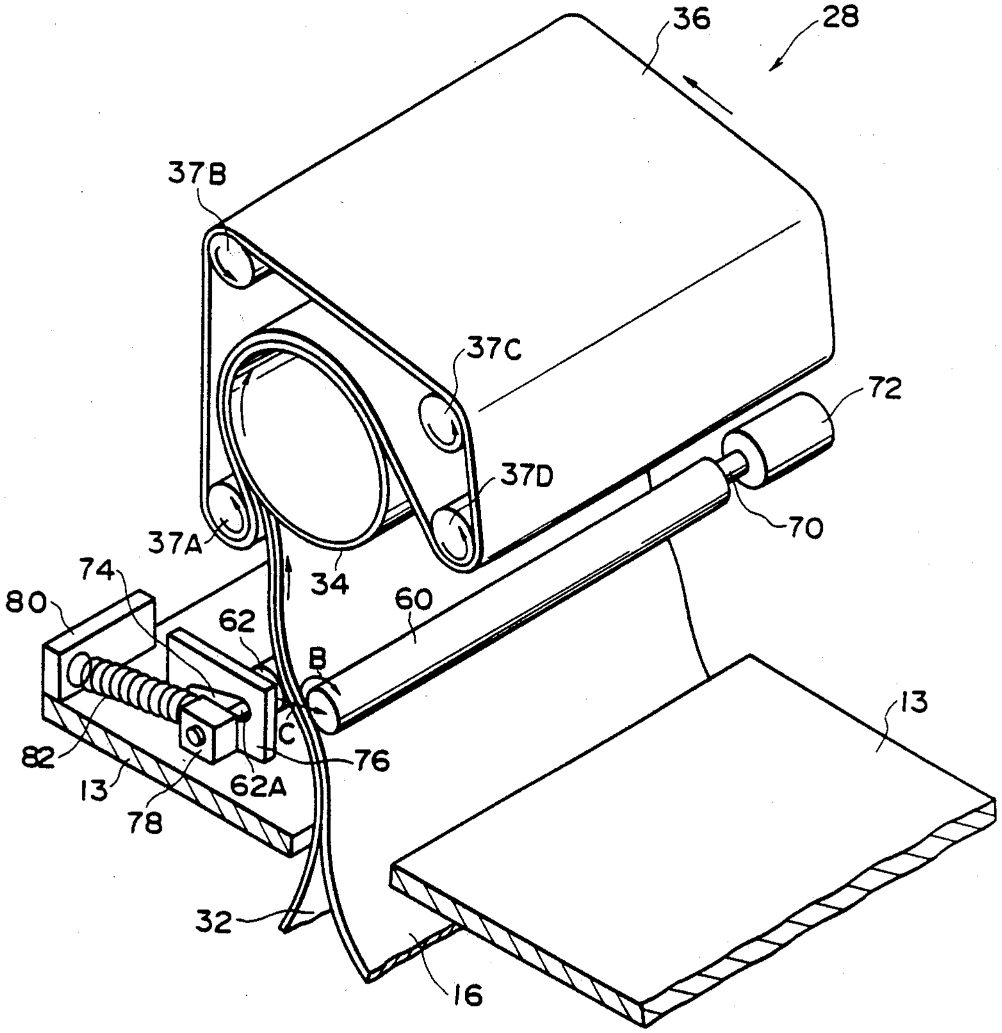
FIG. 2B is a perspective view of a portion of FIG. 1.
Figure 2C:
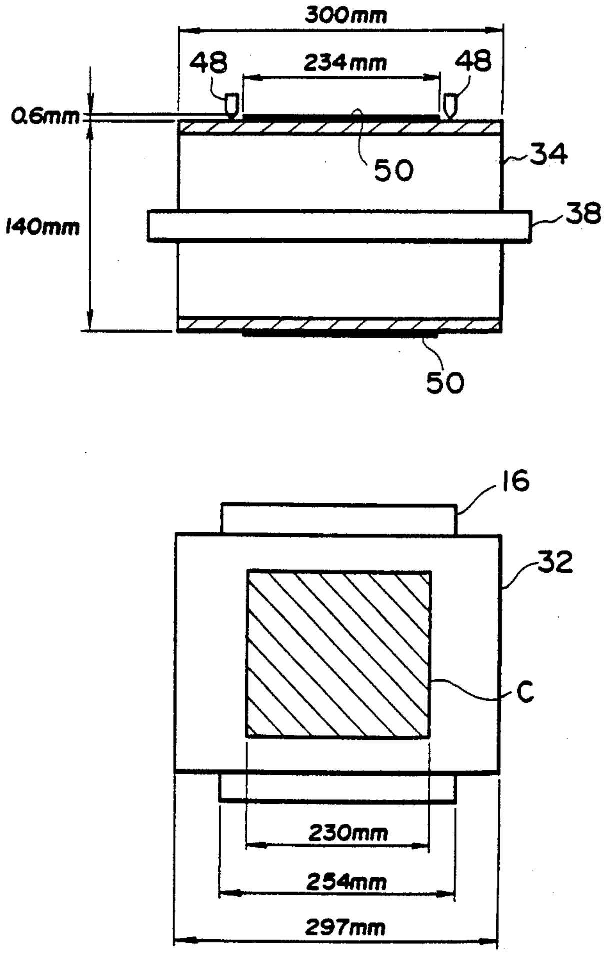
FIG. 2C is a cross-sectional view of the heating drum; the light-sensitive material and the image receiving material shown in FIG. 1, illustrating the positional relationship therebetween.

As shown in FIG. 2B, a motor 72 is connected to roller 60 by a support shaft 70. The roller 60 is rotated by the motor 72 in the direction of arrow B. A pair of bearing plates 76 in which elongated holes 74 are formed are fixed to the partition wall 13 of the base frame 12 at positions corresponding to the extreme ends of roller 62, and the extreme-end small-diameter roller portions 62A of the roller 62 are fitted in the elongated holes 74, thereby rotatably supporting the roller 62. Only one of the bearing plates 76 is shown in FIG. 2B. Extreme ends of the small-diameter roller portions 62A projecting out of the elongated holes 74 are connected to blocks 78 with bearings (not shown) interposed therebetween. A compressing coil spring 82 having one end abutting against a spring receiver 80 that is fixed to the partition wall 13, is connected at its other end to each block 78. In this case, each spring 82 is disposed between the block 78 and the spring receiver 80 in a compressed state, thereby urging the roller 62 through a predetermined pressing force in the direction of the arrow C. The provision of the compression coil spring 82 is not always necessary. The spring 82 may be removed if a sufficient pinching force can be applied between the superposition rollers 60 and 62 even in a case where the axis of the roller 62 is fixedly positioned.

The pair of superposition rollers 60 and 62 are formed of a rubber material. The roller 60 located closest to the heating drum 34 is larger than the roller 62 that is more remote from the heating drum 34. In this embodiment, the superposition roller 60 has a rubber hardness of 50 to 80 degrees while the superposition roller 62 has a rubber hardness of 20 to 50 degrees.

A plurality of sheets of image receiving material 32, uniformly cut in predetermined dimensions (e.g., a length of 210 mm in the case of A4 size, or 420 mm in the case of A3 size, and a width of 297 mm in both cases), are placed in a tray 30 disposed in a power portion of the thermal developing an transferring section 28 inside the exposure chamber E. A developer has been applied to an image formation surface of each image receiving sheet 32. The image receiving sheets 32 are taken out one by one by a feed roller 40 that is disposed within a side wall of the tray 30. Each image receiving sheet 32 that is taken out is introduced into the thermal developing and transferring section 28 while being superposed on the light-sensitive material 16 by the superposition rollers 60 and 62 that are disposed in the thermal developing and transferring section 28.

Since the superposition roller 60 nearest the heating drum 34 is harder than the superposition roller 62 that is more remote from the heating drum 34, the light-sensitive material 16 and the image receiving material 32 are superposed by being pinched between the rollers 60 and 62 in such a manner that they are curved along the outer peripheral surface of the superposition roller 60 with predetermined curvatures, as shown in FIG. 2A. Thus, a slippage between the light-sensitive material 16 and the image receiving material 32 which correspond to the difference between winding radii with which the light-sensitive material 16 and the image receiving material 32 are wound around the heating drum 34, which difference is determined by the thicknesses of the materials, is previously created at the time of superposition, thereby preventing occurrence of an error in placement at the normal superposed position.

As shown in FIG. 2C a pair of scraping claws 48 are disposed by the side of thermal developing and transferring section 28. The scraping claws 48 are spaced outwardly apart from the area on the outer peripheral surface of the heating drum 34 the surface of which is covered with silicone rubber 50. The tip of each scraping claw 48 is in light contact with the outer peripheral surface of the heating drum 34.

The scraping claws 48 engage the heat-developable light-sensitive material 16 which is moving together with the heating drum 34 inside the scraping claws 48, thereby removing the light-sensitive material 16 and the image receiving material 32 from the outer peripheral surface of the heating drum 34.

As shown in FIG. 1, a pair of separation rollers 51 are disposed below the scraping claws 48 so as to face the widthwise end portions of the image receiving material 32 only. A transporting belt 52 is wound around each separation roller 51. The transporting belts 52 wound around the separation rollers 51 engage the widthwise end portions of the image receiving material 32 only, separate the image receiving material 32 from the light-sensitive material 16 and transport the image receiving material 32 while curving the same.

The separated light-sensitive material 16 is sent to a light-sensitive material waste accommodation box 59, and the image receiving material 32 is dried by a heater 54 and is thereafter sent to a take-out tray 56 formed in a top portion of the base frame 12.

Operation of this embodiment will be described below with reference to FIG. 1.

After the light-sensitive material 16 has been drawn out of the magazine 14, cut by the cutter 18 or wound around the outer peripheral surface of the rotary drum 20, the rotary drum 20 is rotated at a high speed (in a main scanning direction). The light-sensitive material 16 is exposed with the image by the exposure head 22 while the exposure head 22 is moving in a direction perpendicular to the projection plane of FIG. 1 (sub-scanning direction).

After exposure, the rotary drum 20 is rotated in the reverse direction, and the light-sensitive material 16 is separated by a scraper 24. Water is applied to the separated light-sensitive material 16, and the light-sensitive material 16 is thereafter sent to the thermal developing and transferring section 28. At this time, the light-sensitive material 16 and the image receiving material 32 are introduced into the thermal developing and transferring section 28 while being pressed uniformly against each other (at about 2 $kg/cm^2$) by the superposing rollers 60 and 62 in the widthwise direction (perpendicular to the projection plane of FIG. 1), and are thereafter pressed uniformly over their whole surfaces between the endless belt 36 and the heating drum 34 thereby being maintained in a uniformly adhered state.

The image receiving material 32 in the tray 30 are taken out one by one by the supply roller 40, and each image receiving material 32 taken out is introduced into the thermal developing and transferring section 28 while being superposed on the light-sensitive material 16 by the superpositon rollers 60 and 62 disposed in the thermal developing and transferring section 28.

At this time, the light-sensitive material 16 and the image receiving material 32 are pinched between the superposition rollers 60 and 62 and are superposed while being curved along the outer peripheral surface of the superposition roller 60 with predetermined curvatures, as shown in FIG. 2A, since the superposition roller 60 nearest the heating drum 34 is harder than the superposition roller 62 that is more remote from the heating drum 34. That is, the light-sensitive material 16 and the image receiving material 32 are superposed with a slippage corresponding to the difference between winding raddi with which the light-sensitive material 16 and the image receiving material 32 are wound around the heating drum 34, which difference is determined by the thickness of the sheets. The possibility of occurrence of an error in placement at the normal superposed position during transfer is thereby eliminated.

In addition, because the portion of the outer peripheral surface of the heating drum 34 which corresponds to the image area is covered with silicone rubber 50 having a large friction coefficient value $\mu$, i.e., 0.5 to 0.6 or more, the light-sensitive material 16 and the image receiving material 32 can be superposed uniformly without being slipped over the heating drum 34 and without being creased when pinched between the heating drum 34 and the endless pressing belt 36.

The light-sensitive material 16 and the image receiving material 32 which were sent to the thermal developing and transferring section 28, are fed forward in a superposed state through a distance of about $\frac{2}{3}$ the circumference of the heating drum 34 which is heated at about 90° C. by a halogen lamp 38 while being pinched between the heating drum 34 and the endless pressing belt 36 (for about 20 seconds), thereby undergoing thermal development. Simultaneously, the image recorded on the light-sensitive material 16 is transferred to the image receiving material 32.

At this time, the light sensitive material 16 and the image receiving material 32 are wound around the outer peripheral surface of the heating drum 34 after they are superposed while creating by the superposition rollers 60 and 62 a slippage corresponding to the difference between the winding radii with which the light sensitive material 16 and the image receiving material 32 are wound around the outer peripheral surface of the heating drum 34, which difference is determined by the thicknesses of the materials. The possibility of occurrence of an error in placement at the normal superposed position during transfer to the image to the image receiving material is therefore eliminated, thereby enabling an improvement in the quality of the image.

After transfer, the scraping claws 48 are brought into engagement with the light-sensitive material 16, that is moving together with the heating drum 34 and located inside the side edges of the image receiving material, thereby removing the light-sensitive material 16 and the image receiving material 32 from the outer peripheral surface of the heating drum 34.

In this arrangement, the scraping claws 48 are spaced outwardly apart from the portion of the outer peripheral surface of the heating drum 34 covered with the silicone rubber 50 (i.e., the tips of the claws are moved without interfering with the silicone rubber 50 while making contact with the outer peripheral surface of the heating drum 34 onoy at opposite end portions thereof). The silicone rubber 50 is thereby prevented from becoming worn fast, and the desired durability can be achieved. In addition, the problem of undesirable heating caused by the contact between the scraping claws 48 and the heating roller 34 within the image area is eliminated (in other words, the sensitized sheet is heated uniformly), thereby preventing nonuniformity of development/transfer.

The image receiving sheet 32, which is removed from the outer peripheral surface of the heating drum 34, is separated from the light-sensitive material 16 by the transporting belts 52, which are wound around the separation rollers 50, and are transported along the heater 54, a forwarded to the take-out tray 56 and then taken out. The separated light-sensitive material 16 is transported to the light-sensitive material waste accommodation box 59.

In the above-described embodiment, the pair of superposition rollers 60 and 62 are formed of rubber. An alternative is for the superposition roller 60, which disposed nearest the heating drum 34, to be formed of a metal.

Figure 3:
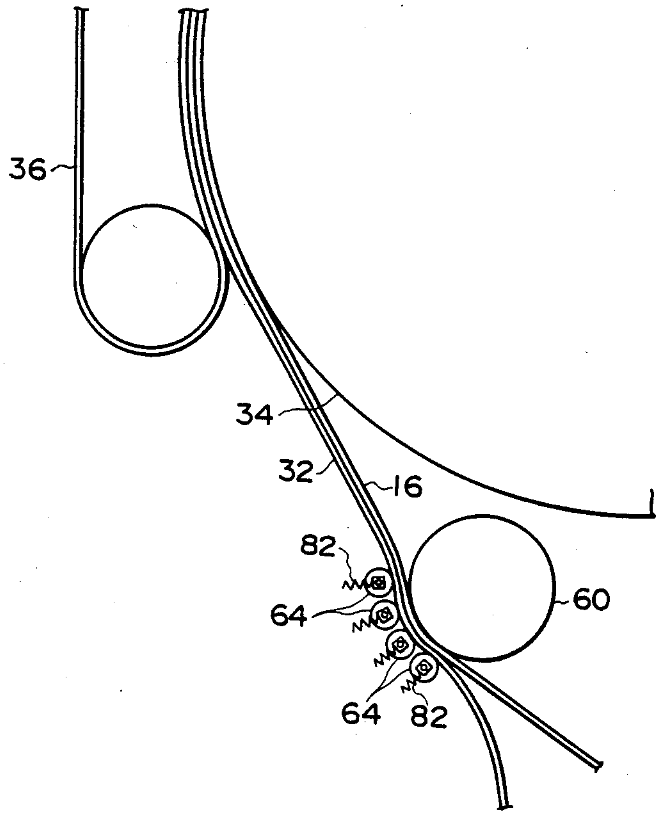
FIG. 3 is an enlarged view of a second embodiment of the present invention corresponding to FIG. 2A.

FIG. 3 shown a second embodiment of the present invention. In this embodiment, the superposition roller 62, which is the more remote from the heating drum 34, is replaced with a plurality of superposition rollers 64 having a smaller diameter, and thereby allowing the light-sensitive material 16 and the image receiving material 32 to be superposed while being curved along the outer peripheral surface of the superposing roller 60 which is positioned nearest the heating drum 34. In this case also, the arrangement may be such that the rollers 64 are guided for movement to or away from the roller 60 while being urged by springs 82. The rollers 64 may be soft as in the case of the above-described embodiment.

Figure 4:
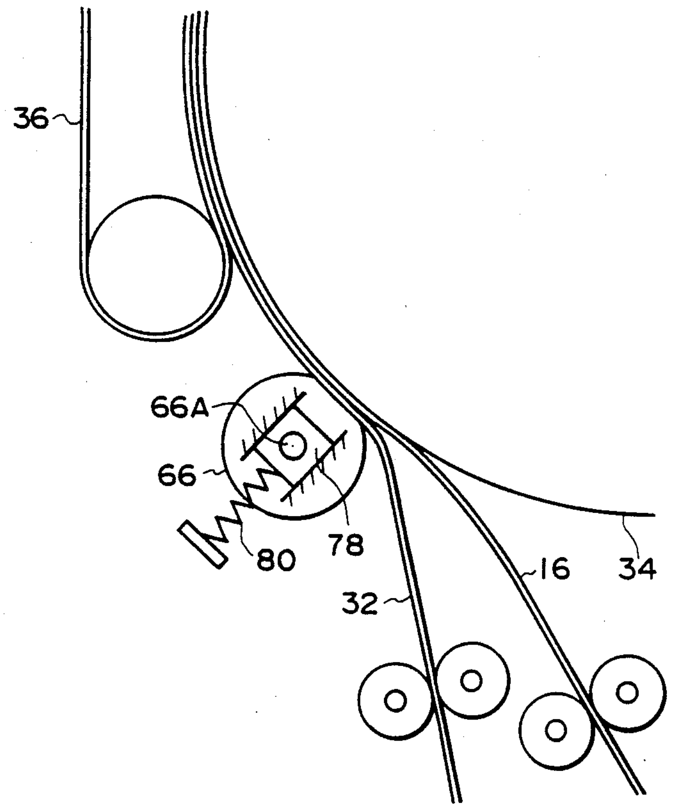
FIG. 4 is an enlarged view of a third embodiment of the present invention corresponding to FIG. 2A.

FIG. 4 shows a third embodiment of the present invention. In this embodiment, a superposition roller 66 having a hardness less than that of the heating drum 34 is disposed in contact with the heating drum 34. The light-sensitive material 16 and the image receiving material 32 are superposed by being pinched between the superposition roller 66 and the heating drum 34. In this case, the superposition of the two materials and the winding of the same around the heating drum 34 are effected simultaneously, thereby improving the effect of preventing any positional error. The roller 66 is not driven by any driving force. Instead, roller 66 is rotated by the torque transmitted from the heating drum 34. In this embodiment also, blocks 78 on which small-diameter portions 66A of the roller 66 are supported is urged by a compression coil spring 80 which presses the roller 66 against the heating drum 34.

What is claimed is:

1. A thermal developing and transferring apparatus in which an image exposed on a light-sensitive an material being developed and transferred to an image receiving material, said apparatus comprising:

a heating drum;

and endless belt partially brought into contact with an outer peripheral surface of said heating drum, said endless belt pinching the light-sensitive material and the image receiving material between said endless belt and said heating drum so as to contact with each other; and means for superposing the light-sensitive material and the image receiving material one on the other and transporting the superposed materials to a position between said heating drum and said endless belt, said means superposing the light-sensitive material and the image receiving material while curving these two materials in conformity with the outer peripheral surface of said heating drum, whereby, when the two materials are wound around the outer peripheral surface of said heating drum while being pressed between said heating drum and said endless belt, the two materials are maintained in normal superposed positions without being influenced by a difference between winding radius with which the two materials are wound around said heating drum.

2. A thermal developing and transferring apparatus according to claim 1, wherein said superposing means superposes the two materials with predetermined curvatures by winding the two materials around a portion of the outer peripheral surface of a superposing roller.

3. A thermal developing and transferring apparatus according to claim 2, wherein a different soft roller is pressed against said superposing roller, and the two materials are wound around the outer peripheral surface of said superposing roller by elastic deformation of said soft roller.

4. A thermal developing and transferring apparatus according to claim 3, wherein said soft roller is pressed against said superposing roller by a resilience force.

5. A thermal developing and transferring apparatus according to claim 2, wherein a plurality of rollers are disposed in different positions along said outer peripheral surface of said superposing roller in a circumferential direction.

6. A thermal developing and transferring apparatus according to claim 5, wherein the diameter of each of said plurality of rollers is smaller than that of said superposing roller.

7. A thermal developing and transferring apparatus according to claim 1, wherein said superposing means includes a roller which is softer than said heating drum and which is pressed against a portion of the outer peripheral surface of said heating drum which does not face said endless belt, and the two materials are superposed while being curved along the outer peripheral surface of said heating drum as said soft roller is elastically deformed.

8. A thermal developing and transferring apparatus according to claim 1, wherein frictional material for increasing friction between the outer peripheral surface of said heating drum and the corresponding one of the two materials is applied to the outer peripheral surface of said heating drum to prevent occurrence of slippage between this surface and the material.

9. A thermal developing and transferring apparatus according to claim 8, wherein said frictional material for increasing the friction is applied over an area having a dimension in the axial direction of said drum smaller than the width of the light-sensitive material and larger than the width of the image recorded by exposure.

10. A thermal developing and transferring apparatus in which an exposed light-sensitive material and an image receiving material being superposed one of the other and are supplied to the periphery of a heating drum, and in which the light-sensitive material and the image receiving material in the superposed state are heated while being wound around the outer peripheral surface of said heating drum to simultaneously thermally develop and transfer an image of the light-sensitive material to the image receiving material, said apparatus comprising superposition roller means for superposing the light-sensitive material and the image receiving material with predetermined curvatures before the light-sensitive material and the image receiving material are supplied to the periphery of said heating drum.

11. A thermal developing and transferring apparatus according to claim 10, wherein said superposition roller means includes a hard and a soft roller, and said soft roller is pressed against said hard roller and is thereby elastically deformed so that the two materials are curved along the outer peripheral surface of said hard roller with the predetermined curvatures.

12. A thermal developing and transferring apparatus according to claim 11, wherein said soft roller is pressed against said hard roller by an urging force.

13. A thermal developing and transferring apparatus according to claim 10, wherein said superposition roller means includes a first roller and a plurality of second rollers pressed against the outer peripheral surface of said first roller, said first and second rollers superposing the two materials while curving the same along the outer peripheral surface of said first roller.

14. A thermal developing and transferring apparatus according to claim 13, wherein said plurality of second rollers are pressed against said first roller by an urging force.

15. A thermal developing and transferring apparatus according to claim 13, wherein the diameter of each of said second rollers is smaller than that of said first roller.

16. A thermal developing and transferring apparatus in which a light-sensitive material exposed with an image being superposed on a image receiving material so as to transfer the image to the image receiving material, said apparatus comprising:

- a heating drum around which the two materials are wound;
- a thermal developing and transferring section provided along the periphery of said heating drum;
- transporting means for supplying the two materials to the periphery of said hating drum; and
- a superposition roller for supplying the two materials to said thermal developing and transferring section after curving the two materials with curvatures in conformity with the outer peripheral surface of said heating drum by pressing the two material against this outer peripheral surface at a position upstream of said thermal developing and transferring section.

17. A thermal developing and transferring apparatus according to claim 16, wherein said superposition roller is harder than said heating drum.

18. A thermal developing and transferring apparatus according to claim 16, wherein said superposition roller is pressed by an urging force against the outer peripheral surface of said heating drum.

19. A thermal developing and transferring apparatus according o claim 16, wherein a frictional material for increasing the friction between the outer peripheral surface of said heating drum and the corresponding one of the two sheets is applied to the outer peripheral surface of said heating drum to prevent occurrence of slippage between the outer peripheral surface and the material.

20. A thermal developing and transferring apparatus according to claim 19, wherein said frictional material is applied over an area having a dimension in the axial direction of said drum smaller than the width of the light-sensitive material and larger than the width of the image recorded by exposure.

* * * * *